UNITED STATES PATENT OFFICE.

SAMUEL GREEN, OF DENVER, COLORADO TERRITORY.

IMPROVED COMPOSITION FOR EXTERMINATING GRASSHOPPERS.

Specification forming part of Letters Patent No. 49,258, dated August 8, 1865.

*To all whom it may concern:*

Be it known that I, SAMUEL GREEN, of the city of Denver, in the county of Arapahoe and Territory of Colorado, have invented and discovered a new and Improved Method of Exterminating and Destroying Grasshoppers by Means of a Certain Composition of Matter; and I do hereby declare that the following is a full and exact description of the same.

The nature of my invention and discovery consists in the mixture and combination of certain articles, which when sprinkled over the field of the farmer, or locality infested by grasshoppers, will kill and destroy them, and thus prevent them from destroying any growing crop.

To enable others skilled in the art to make and use my invention and discovery, I will proceed to describe its construction and component parts and its operation.

I take three gallons of lime-water containing the entire strength or essence of one bushel of unslaked lime, five gallons strong lye made from ashes, one and one-fourth gallon of tobacco-juice containing the entire strength of ten pounds of tobacco-stems, four ounces phosphorus, four ounces of arsenic, one-half gallon of petroleum or coal oil, four ounces opodeldoc, four ounces spirits of camphor, four ounces spirits of turpentine, four pounds beef-gall, four ounces of flour of sulphur, and one-half pound cayenne pepper. These ingredients are compounded either in a liquid or solid substance, one pound of which compound dissolved in a barrel of water and sprinkled over the locality infested by grasshoppers is sufficient to destroy them on one acre of ground.

What I claim as my invention and discovery, and desire to secure by Letters Patent, is—

The combination and mixture and preparation of the above enumerated ingredients in the aforesaid manner for the purposes above set forth, and the exclusive right to prepare the same for use and sale in those sections of the United States where grasshoppers are so numerous as to completely destroy growing crops.

SAMUEL GREEN.

Witnesses:
S. NATHAN,
I. Q. CHASE.